United States Patent
Rathke et al.

(10) Patent No.: US 8,402,759 B2
(45) Date of Patent: Mar. 26, 2013

(54) DRIVE HAVING AN ENERGY STORAGE DEVICE AND METHOD FOR STORING KINETIC ENERGY

(75) Inventors: Rolf Rathke, Ulm (DE); Christine Ehret, Elchingen (DE); Martin Behm, Ulm (DE); Matthias Mueller, Neusaess (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 777 days.

(21) Appl. No.: 12/280,976

(22) PCT Filed: May 30, 2007

(86) PCT No.: PCT/EP2007/004794
§ 371 (c)(1),
(2), (4) Date: Dec. 8, 2009

(87) PCT Pub. No.: WO2007/140914
PCT Pub. Date: Dec. 13, 2007

(65) Prior Publication Data
US 2010/0089044 A1    Apr. 15, 2010

(30) Foreign Application Priority Data

Jun. 2, 2006  (DE) .......................... 10 2006 025 982
Sep. 8, 2006  (DE) .......................... 10 2006 042 390

(51) Int. Cl.
*F16D 31/02*    (2006.01)

(52) U.S. Cl. ............................................ 60/413; 60/414
(58) Field of Classification Search .................... 60/413, 60/414; 180/165
See application file for complete search history.

(56) References Cited

U.S. PATENT DOCUMENTS

| | | | |
|---|---|---|---|
| 4,242,922 A * | 1/1981 | Baudoin ........................ | 60/413 |
| 5,505,527 A * | 4/1996 | Gray et al. ..................... | 60/413 |
| 6,712,166 B2 | 3/2004 | Rush et al. | |

FOREIGN PATENT DOCUMENTS

| | | |
|---|---|---|
| DE | 19 07 748 B | 5/1972 |
| DE | 24 48 723 A1 | 4/1976 |
| DE | 32 47 335 A1 | 9/1983 |
| DE | 32 47 289 A1 | 10/1983 |
| DE | 36 21 290 C2 | 1/1988 |
| DE | 43 33 564 A1 | 4/1995 |
| DE | 102 32 404 A1 | 1/2004 |

* cited by examiner

*Primary Examiner* — Michael Leslie
(74) *Attorney, Agent, or Firm* — Scully, Scott, Murphy & Presser, P.C.

(57) ABSTRACT

The invention relates to a drive (1) having an energy storage device and a method for storing brake energy. A drive (1) has an energy storage device having a hydrostatic piston engine (9) and a storage element (11) which is connected thereto. In a high-pressure storage line (10), an adjustable throttle location (15) is arranged between the piston engine (9) and the storage element (11). During the braking operation, the adjustable throttle location (15) is adjusted in accordance with a detected requested brake torque. The pressure medium is conveyed from the hydrostatic piston engine (9) via the adjustable throttle location (15) into the storage element (11).

12 Claims, 1 Drawing Sheet

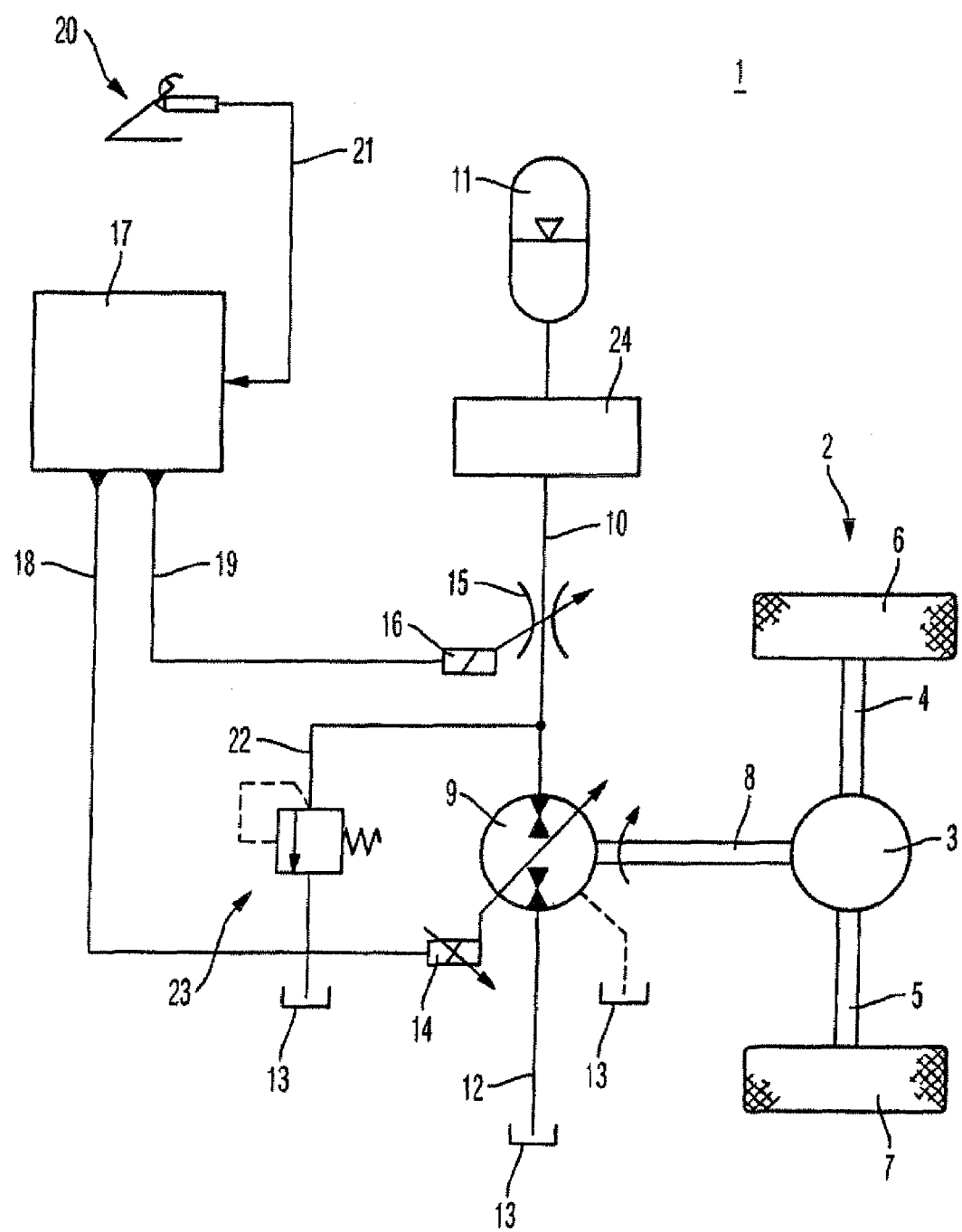

DRIVE HAVING AN ENERGY STORAGE DEVICE AND METHOD FOR STORING KINETIC ENERGY

The invention relates to a drive having an energy storage device and a method for storing kinetic energy.

It is known, for example, from U.S. Pat. No. 6,712,166 B2, in order to store kinetic energy in vehicles having intensive travel cycles, that is to say, frequent braking and subsequent re-acceleration, to store kinetic energy in the form of pressure energy. To this end, a hydraulic pump is coupled to a travel drive. The hydraulic pump conveys pressure medium into a pressure store by being operated as a pump during a braking operation. Conversely, the pressure energy can be recovered by the hydraulic pump which can also be operated as a hydraulic motor by the pressure store being depressurised via the hydraulic pump. With the arrangement known from U.S. Pat. No. 6,712,166 B2, a flow control valve is used in this instance in order to maintain the brake pressure at a constant level.

The arrangement described therefore has the disadvantage that the brake performance is not influenced during the brake energy recovery. If, for example, a higher brake torque is requested, in addition to the charging of the pressure store, kinetic energy must be dissipated by a friction brake being activated by the vehicle driver.

The object of the invention is therefore to allow a variable brake performance with the system for brake energy recovery and to provide a corresponding method.

The object is achieved with the drive according to the invention having the features of claim 1 and the method according to claim 10.

With the drive having the features of claim 1 and the method according to claim 10, an adjustable throttle location is provided in addition to the hydrostatic piston engine and the storage element which is connected thereto. Using the adjustable throttle location, it is possible to adjust a pressure drop in the supply line connected to the piston engine. Consequently, the pressure against which the hydrostatic piston engine conveys during the braking operation, and therefore the brake torque available, is adjusted.

Advantageous developments of the drive according to the invention are set out in the subsidiary claims.

In particular, it is advantageous, in addition to the adjustable throttle, to also provide an adjustable piston engine. Owing to the adjustment of the supply volume of the hydrostatic piston engine, the brake performance is also intended to be increased, for example, by increasing the supply quantity of the hydrostatic piston engine. The throttle location and/or the hydrostatic piston engine are preferably adjusted in accordance with a brake signal. The brake signal may, for example, be a brake force or the brake pedal position which is applied to or determined on a brake pedal by the vehicle driver. In particular, it is advantageous to increase the supply volume and/or the throttle action through the throttle location as the brake pedal force or brake pedal path increases. The brake pedal path is obtained from the initial position of the brake pedal and the determined brake pedal position. The statements below refer, by way of illustration, to the brake pedal force and correspondingly also relate to the brake pedal path.

It is particularly advantageous, firstly as the brake performance requested increases, that is to say, as the level of brake pedal force increases, to adjust the supply quantity of the hydrostatic piston engine in the direction towards the maximum supply volume thereof and subsequently, as the brake pedal force increases further, to increase the throttle action through the adjustable throttle location.

With the adjustment of the throttle location, the respective charge state of the storage element is also preferably taken into account. During a braking operation, pressure medium is conveyed into the storage element by the hydrostatic piston engine. The pressure in the hydrostatic storage element is thereby increased. Consequently, the brake performance is increased under otherwise identical conditions. This changing brake performance can be compensated for by appropriate adjustment of the adjustable throttle location since this controls the pressure at the pump side in a proportional manner relative to the brake pedal signal, when the full pump pivot angle is reached. Consequently, for example, with the storage pressure which is low at the beginning, a greater throttle action is adjusted and sufficient brake performance is ensured by a build-up of pressure upstream of the throttle location. If, when additional pressure medium is supplied into the storage element, the brake performance increases in any case owing to the increasing counter-pressure, the throttle location is increasingly adjusted in the "open" direction as the storage pressure increases.

A preferred embodiment of the drive according to the invention having a brake energy storage device is illustrated in the drawing and explained below:

FIG. 1 is a schematic illustration of a drive according to the invention having an energy storage device.

FIG. 1 is a schematic illustration of a drive 1 according to the invention. The drive 1 according to the invention is used, for example, to drive a drive axle 2. The driven drive axle 2 has an axle differential 3 which acts on the driven wheels 6, 7 of the vehicle by means of a first half-axle 4 and a second half-axle 5.

The drive 1 illustrated is in particular a travel drive of a utility vehicle having intensive travel cycles. Intensive travel cycles of this type which contain a large number of braking and subsequent acceleration operations may occur, for example, in refuse collection vehicles, wheeled loaders and fork lift trucks. In order to be able to reuse the kinetic energy released during the braking operation, the drive 1 has an energy storage device. The energy storage device is connected to the drive axle 2 by means of a coupling shaft 8. For reasons of simplicity, the coupling shaft 8 is illustrated in FIG. 1 as being connected to the rear axle differential 3. However, it is also possible to connect the coupling shaft 8 to a drive shaft which is not illustrated, for example, a cardan shaft. As an additional alternative, it is also possible to connect a hydrostatic piston engine 9 of the energy storage device directly to a cardan shaft of a drive 1. In the embodiment illustrated, the hydrostatic piston engine 9 is connected to the rear axle differential 3 by means of the coupling shaft 8. Consequently, the hydrostatic piston engine 9 is driven at a speed which is dependent on the speed of the vehicle. The hydrostatic piston engine 9 is constructed so as to be adjustable in terms of the supply volume thereof and is provided to convey pressure medium in two directions.

The hydrostatic piston engine 9 is connected to a hydraulic storage element 11 by means of a high-pressure storage line 10. The storage element 11 is preferably constructed as a high-pressure store and is produced, for example, in the form of a hydraulic membrane store.

During a braking operation, in which, owing to the mass inertia, the vehicle drives the hydrostatic piston engine 9 by means of the rear axle differential 3 and the coupling shaft 8, pressure medium is conveyed into the storage element 11 via the supply line 10. To this end, the hydrostatic piston engine 9 draws pressure medium from a tank space 13 via an intake line 12 and conveys it into the storage element, with the pressure being increased. Consequently, kinetic energy which is released is stored in the form of pressure energy.

In an alternative configuration, a second storage element may be provided in place of the tank space 13 and is constructed as a low-pressure store. The use of a second storage element in the form of a low-pressure store has the advantage that a defined input pressure is present in each case at the intake side of the hydrostatic piston engine 9 during braking operation. Consequently, the appearance of cavitations at the intake side of the hydrostatic piston engine 9 is prevented.

The hydrostatic piston engine 9 can be adjusted in terms of the supply volume thereof. To this end, the adjustment mechanism thereof co-operates with an adjustment device 14. The adjustment device 14 is electrically controlled in the illustrated embodiment of FIG. 1, which is indicated in the drawing in a simplified manner by means of a proportional magnet.

Between the storage element 11 and the hydrostatic piston engine 9, an adjustable throttle 15 is arranged according to the invention. The adjustable throttle 15 can be adjusted in the same manner as the hydrostatic piston engine 9 by means of a throttle adjustment device 16. Consequently, the flow resistance in the high-pressure storage line 10 can be adjusted.

In order to activate the adjustment device 14 and the throttle adjustment device 16, an electronic control unit 17 is used. The electronic control unit 17 is connected to the adjustment device 14 by means of a first signal line 18 and to the throttle adjustment device 16 by means of a second signal line 19. The electronic control unit 17 receives a brake signal from a brake pedal 20 via a brake signal line 21. The brake signal may, for example, be proportional to the brake pedal force applied to the brake pedal. In order to protect the high-pressure storage line 10, a pressure-limitation valve 23 is provided. The pressure-limitation valve 23 is connected to the high-pressure storage line 10 by means of a safety line 22. If the pressure in the safety line 22 exceeds a determined critical threshold value, the pressure limitation valve 23 opens and depressurises the high-pressure storage line 10 in a tank space 13.

A preferred configuration of the method for storing brake energy and the subsequent recovery is described below.

A vehicle which travels at a specific speed has a kinetic energy which corresponds to the speed and vehicle mass. If the vehicle is decelerated, this kinetic energy is dissipated. With the drive according to the invention having an energy storage device, the hydrostatic piston engine 9 is caused to rotate by means of the coupling shaft 8, as has already been explained above. Depending on the brake pedal force on the brake pedal 20, the electronic control unit 17 receives a brake signal via the brake signal line 21. A specific required brake torque is established on the basis of the brake pedal force. In accordance with an increasing requested brake torque, the hydrostatic piston engine 9 is adjusted in the direction of a larger supply volume.

To this end, an adjustment signal is transmitted to the adjustment device 14 from the electronic control unit 17 via the first signal line 18. As the brake pedal force 20 increases, the hydrostatic piston engine 9 is adjusted in the direction of an increasing supply volume. If the brake torque requested, that is to say, the brake pedal force produced at the brake pedal 20, exceeds a value which demands the maximum supply volume of the hydrostatic piston engine 9, in order to further increase the brake torque or the brake performance, the adjustable throttle 15 is adjusted in the direction of a greater throttle action. To this end, a corresponding adjustment signal is transmitted to the throttle adjustment device 16 by the electronic control unit 17, via the second signal line 19.

In order to allocate the adjustment values for the supply volume or the throttle action of the adjustable throttle 15, for example, tables are stored in the electronic control unit 17 so that the required signal values can be read off based on the incoming brake signal.

The storage pressure in the storage element 11 acts as an additional parameter of influence. If a high pressure is already present in the storage element 11, for example, owing to a previous braking operation, then the adjustment signal which is transmitted to the throttle adjustment device 16 by the electronic control unit 17 is reduced by an appropriate amount. Consequently, for example, for a specific required brake performance, the adjusted throttle action is less if the storage element 11 is already filled and consequently has a higher pressure than if the storage element 11 is completely empty. Owing to the adapted adjustment of the adjustable throttle 15, an overall brake performance is adjusted which is preferably proportional to the brake pedal force applied to the brake pedal 20. This has the advantage that, owing to the brake action produced in this manner, the vehicle is decelerated in a manner which can be metered for the vehicle driver.

In order to further protect the system and in particular the storage element 11, a safety unit 24 is arranged in the high-pressure storage line 10. This safety unit 24 may have, for example, an additional pressure limitation valve which is not illustrated and which responds to a pressure in the storage element 11. Consequently, it is possible, for a pressure acting portion of the high-pressure storage line 10 between the hydrostatic piston engine 9 and the adjustable throttle 15, to adjust a first threshold value using the pressure-limitation valve 23 and, for the portion of the high-pressure storage line 10 in the direction towards the storage element 11, a second threshold value using the safety unit 24. In addition, the safety unit 24 may preferably contain a blocking valve in order to interrupt the high-pressure storage line 10. If, for example, when the storage element 11 is full, the stored energy is not recovered at that time owing to continuous transport motion, pressure losses owing to leakage are effectively prevented by a blocking valve of this type.

In order to recover stored energy, the pressure medium is removed from the storage element 11 and, with the adjustable throttle 15 completely open, is supplied to the hydrostatic piston engine 9. In this instance, the hydrostatic piston engine 9 acts as a hydraulic motor. The pressure medium which is in a state of high-pressure in the storage element 11 is depressurised in the tank space 13 by means of the hydrostatic piston engine 9. Consequently, a torque is produced by means of the hydrostatic piston engine 9 and is available to the vehicle drive via the coupling shaft 8.

Via the first signal line 18, an adjustment signal is transmitted to the adjustment device 14 in this instance and, owing to the acceleration request, is detected by the electronic control unit 17.

In the embodiment illustrated, the energy storage is brought about by means of a separate energy storage system. However, it is also possible, for example, with a hydrostatic travel drive, to integrate the system in the hydraulic circuit and in particular also in a closed hydraulic circuit. Owing to the additional adjustable throttle 15, by means of which the counter-pressure for the hydrostatic piston engine 9 can be increased according to the invention, it is possible to use, for example, smaller displacement units in the energy storage device. The brake torque is adapted by increasing the counter-pressure. Consequently, a higher brake torque can be applied than the pressure in the storage element 11 together with the maximum supply volume of the hydrostatic piston engine 9 would allow. Furthermore, a vehicle brake, which brakes the vehicle by means of friction, is also depressurised. The depressurisation is a consequence of the relatively high maximum available brake force owing to the energy storage device.

The invention is not limited to the embodiment set out but may also contain the combination of individual features of the preferred embodiment.

The invention claimed is:

1. A drive comprising an energy storage device, the energy storage device comprising:
    a hydrostatic piston engine, the supply volume of the hydrostatic piston engine being adjustable in accordance with a brake signal;
    a storage element connected to the hydrostatic piston engine; and
    an adjustable throttle location arranged in a high-pressure storage line between the hydrostatic piston engine and the storage element, the adjustable throttle location being adjustable in accordance with the brake signal in such a manner that the throttle action of the adjustable throttle location is adapted according to the brake signal.

2. The drive according to claim 1, wherein the brake signal is proportional to a brake pedal force on a brake pedal, or a brake pedal path.

3. The drive according to claim 2, wherein the hydrostatic piston engine is adjustable as the brake pedal force or brake pedal path increases in the direction of an increasing displacement volume.

4. The drive according to claim 3, wherein, with a maximum displacement volume and as the brake pedal force or brake pedal path further increases, the throttle location is adjustable to an increasing throttle action.

5. The drive according to claim 1, wherein the throttle location is adjustable in accordance with a pressure in the storage element.

6. The drive according to claim 5, wherein the increase of the brake torque owing to pressure increase in the storage element is compensable by a counter-adjustment of the adjustable throttle location.

7. A method for storing kinetic energy by means of a drive comprising a hydrostatic piston engine connected to a storage element by means of a high-pressure storage line, the supply volume of the hydrostatic piston engine being adjustable in accordance with a brake signal, the drive further comprising an adjustable throttle location adjustable in accordance with the brake signal, the method comprising:
    detecting a requested brake torque,
    adjusting the adjustable throttle location in accordance with the requested brake torque, such that the throttle action of the adjustable throttle location is adapted according to the brake signal, and
    conveying pressure medium into the storage element via the adjustable throttle location.

8. The method according to claim 7, wherein in accordance with the requested brake torque, the hydrostatic piston engine is first adjusted in terms of the supply volume thereof.

9. The method according to claim 7, wherein the displacement volume of the hydrostatic piston engine is adjusted in a proportional manner relative to the requested brake torque.

10. The method according to claim 7, wherein as the requested brake torque increases, the hydrostatic piston engine is adjusted in the direction of the maximum displacement volume thereof and, after reaching the maximum displacement volume, and as the requested brake torque further increases, the adjustable throttle location is adjusted in the direction of a greater throttle action.

11. The method according to claim 7, wherein the adjustable throttle location is adjusted in the direction of a lesser throttle action as the pressure in the storage element increases.

12. The method according to claim 11, wherein, owing to the adjustment of the throttle location in the direction of a lesser throttle action as the pressure in the storage element increases, the increase in brake torque brought about by the pressure increase in the storage element is precisely compensated for.

* * * * *